US011144431B2

(12) United States Patent
Aubert

(10) Patent No.: US 11,144,431 B2
(45) Date of Patent: Oct. 12, 2021

(54) CONFIGURATION-BASED CODE CONSTRUCT FOR RESTRICTION CHECKS IN COMPONENT OF A WEB APPLICATION

(71) Applicant: EMC IP Holding Company LLC, Hopkinton, MA (US)

(72) Inventor: Raphaël Aubert, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/776,902

(22) Filed: Jan. 30, 2020

(65) Prior Publication Data

US 2021/0240595 A1 Aug. 5, 2021

(51) Int. Cl.

| | |
|---|---|
| ***G06F 8/38*** | (2018.01) |
| ***G06F 9/44*** | (2018.01) |
| ***G06F 11/36*** | (2006.01) |
| ***G06F 8/71*** | (2018.01) |
| ***G06F 16/958*** | (2019.01) |

(Continued)

(52) U.S. Cl.

CPC ............ *G06F 11/3616* (2013.01); *G06F 8/71* (2013.01); *G06F 16/986* (2019.01); *G06F 8/65* (2013.01); *G06F 16/2246* (2019.01); *G06F 16/289* (2019.01); *G06F 16/9014* (2019.01);

(Continued)

(58) Field of Classification Search

CPC ............... G06F 11/3616; G06F 16/986; G06F 16/2246; G06F 16/958; G06F 16/289; G06F 16/95; G06F 16/9014; G06F 16/90344; G06F 8/71; G06F 8/65

See application file for complete search history.

(56) References Cited

U.S. PATENT DOCUMENTS 9,473,457 B2 * 10/2016 Koved .................... H04L 67/02
10,241,774 B2 * 3/2019 Spivak .................... H04L 67/34

(Continued)

OTHER PUBLICATIONS

Roope Hakulinen, Using Immutable Data Structures to Optimize Angular Change Detection, May 2018, [Retrieved on Apr. 10, 2021]. Retrieved from the internet: <URL: https://trepo.tuni.fi/bitstream/handle/123456789/26217/Hakulinen.pdf?sequence=4> 50 Pages (1-43) (Year: 2018).*

(Continued)

*Primary Examiner* — Anibal Rivera

(74) *Attorney, Agent, or Firm* — Ryan, Mason & Lewis, LLP

(57) ABSTRACT

An apparatus includes at least one processing device configured to intercept activation of a lifecycle hook of a component of a web application, the lifecycle hook of the component of the web application being associated with a configuration-based code construct specifying one or more restriction checks. The at least one processing device is also configured to perform the one or more restriction checks specified in the configuration-based code construct associated with the lifecycle hook of the component of the web application. The at least one processing device is further configured to modify the component of the web application based at least in part on results of performing the one or more restriction checks specified in the configuration-based code construct associated with the lifecycle hook of the component of the web application, and to activate the lifecycle hook with the modified component of the web application.

20 Claims, 7 Drawing Sheets

(51) Int. Cl.

| | |
|---|---|
| *G06F 16/22* | (2019.01) |
| *G06F 16/95* | (2019.01) |
| *G06F 16/901* | (2019.01) |
| *G06F 16/903* | (2019.01) |
| *G06F 8/65* | (2018.01) |
| *G06F 16/28* | (2019.01) |

(52) U.S. Cl.

CPC ........ *G06F 16/90344* (2019.01); *G06F 16/95* (2019.01); *G06F 16/958* (2019.01)

(56) References Cited

U.S. PATENT DOCUMENTS

| | | | | |
|---|---|---|---|---|
| 10,642,896 | B2 * | 5/2020 | Bequet | G06N 3/084 |
| 10,650,045 | B2 * | 5/2020 | Bequet | G06F 16/90344 |
| 10,650,046 | B2 * | 5/2020 | Bequet | G06N 3/084 |
| 10,795,935 | B2 * | 10/2020 | Bequet | G06F 16/9014 |
| 2003/0154239 | A1 | 8/2003 | Davis et al. | |
| 2007/0147306 | A1 | 6/2007 | Halpern | |
| 2007/0255781 | A1 * | 11/2007 | Li | H04L 67/28 709/201 |
| 2009/0132285 | A1 * | 5/2009 | Jakobovits | G06F 3/0482 705/3 |
| 2009/0138792 | A1 * | 5/2009 | Cudich | G06F 40/10 715/234 |
| 2011/0145360 | A1 | 6/2011 | Sheshagiri et al. | |
| 2012/0166963 | A1 | 6/2012 | Kohli et al. | |
| 2012/0266156 | A1 * | 10/2012 | Spivak | G06F 8/71 717/172 |
| 2015/0039682 | A1 * | 2/2015 | Chasman | G06F 16/289 709/203 |
| 2015/0039999 | A1 * | 2/2015 | Chasman | H04L 67/10 715/234 |
| 2015/0046915 | A1 * | 2/2015 | Oliver | H04L 67/10 717/170 |
| 2015/0089068 | A1 * | 3/2015 | Islam | H04L 41/5045 709/226 |
| 2016/0077824 | A1 * | 3/2016 | Vishnepolsky | H04L 67/02 717/172 |
| 2016/0179317 | A1 * | 6/2016 | Karthikeyan | H04L 67/306 715/765 |
| 2016/0285958 | A1 | 9/2016 | Das et al. | |
| 2016/0357715 | A1 * | 12/2016 | Li | G06F 16/95 |
| 2017/0147335 | A1 * | 5/2017 | Parees | G06F 8/30 |
| 2017/0168813 | A1 * | 6/2017 | Pogrebinsky | G06F 8/70 |
| 2018/0145884 | A1 * | 5/2018 | Stefanov | H04L 41/5048 |
| 2019/0212881 | A1 * | 7/2019 | Rommel | G06F 9/451 |
| 2019/0266225 | A1 * | 8/2019 | Solis | G06F 16/972 |
| 2019/0266226 | A1 * | 8/2019 | Kirn | G06F 40/137 |
| 2019/0266227 | A1 * | 8/2019 | Kirn | G06F 40/143 |
| 2020/0026500 | A1 * | 1/2020 | Rommel | G06F 9/451 |

OTHER PUBLICATIONS

Greg Lim, Beginning Angular 2 with Typescript, 2017, [Retrieved on Apr. 10, 2021]. Retrieved from the internet: <URL: http://silicart.ru/wp-content/uploads/2017/06/Beginning-Angular-2-with-Typescript.pdf> 162 Pages (1-162) (Year: 2017).*

Jukkla Korva, Developing a Web Application with Angular 2, 2012, [Retrieved on Jul. 22, 2021]. Retrieved from the internet: <URL: https://www.theseus.fi/bitstream/handle/10024/121905/Korva_Jukka.pdf?sequence=1> 35 Pages (1-35) (Year: 2016).*

Suresh Kumar Gudla et al., Framework to Improve the Web Application Launch Time, 2016 IEEE [Retrieved on Jul. 22, 2021]. Retrieved from the internet: <URL: https://ieeexplore.ieee.org/stamp/stamp.jsp?tp=&arnumber=7787057> 6 Pages (73-78) (Year: 2016).*

Michael Geers, "Micro Frontends—Extending the Microservice Idea to Frontend Development," https://micro-frontends.org/, downloaded Sep. 30, 2019, 6 pages.

U.S. Appl. No. 16/673,052, filed in the name of Raphaël Aubert Nov. 4, 2019, and entitled "Using Web Application Components with Different Web Application Frameworks in a Web Application."

U.S. Appl. No. 16/588,168, filed in the name of Raphaël Aubert Sep. 30, 2019, and entitled "Migration of Web Applications between Different Web Application Frameworks."

* cited by examiner

CONFIGURATION-BASED CODE CONSTRUCT FOR RESTRICTION CHECKS IN COMPONENT OF A WEB APPLICATION

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for enabling restriction checks in components of web applications using configuration-based code constructs.

In one embodiment, an apparatus comprises at least one processing device comprising a processor coupled to a memory. The at least one processing device is configured to perform the step of intercepting activation of a lifecycle hook of a component of a web application, the lifecycle hook of the component of the web application being associated with a configuration-based code construct specifying one or more restriction checks. The at least one processing device is also configured to perform the step of performing the one or more restriction checks specified in the configuration-based code construct associated with the lifecycle hook of the component of the web application. The at least one processing device is further configured to perform the steps of modifying the component of the web application based at least in part on results of performing the one or more restriction checks specified in the configuration-based code construct associated with the lifecycle hook of the component of the web application, and activating the lifecycle hook with the modified component of the web application.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
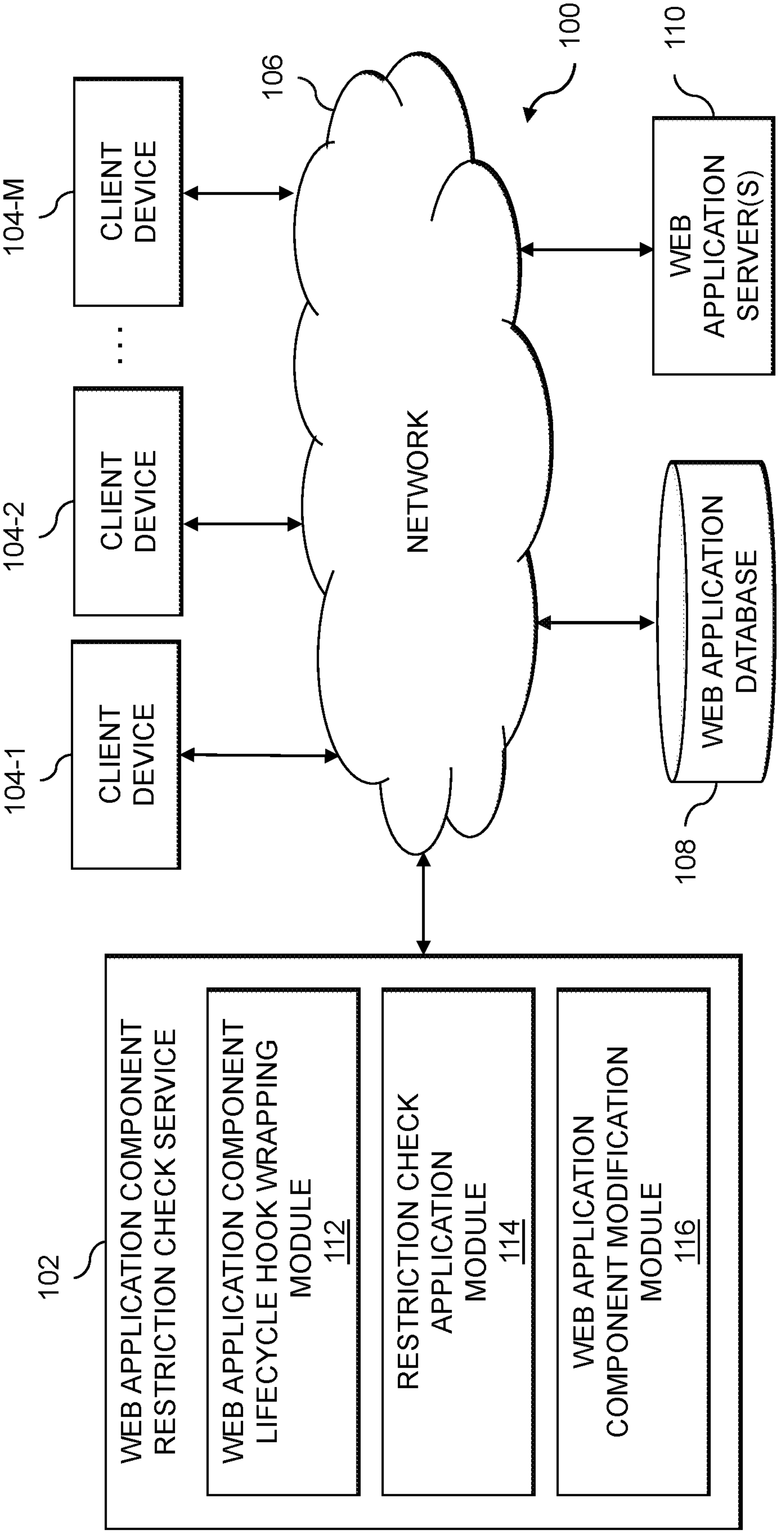
FIG. 1 is a block diagram of an information processing system for enabling restriction checks in components of web applications using configuration-based code constructs in an illustrative embodiment.

FIG. 1 shows an information processing system 100 configured in accordance with an illustrative embodiment. The information processing system 100 is assumed to be built on at least one processing platform and provides functionality for enabling restriction checks in components of web applications using configuration-based code constructs. The configuration-based code constructs, as will be described in further detail below, may include annotations also referred to as decorators in the JavaScript and TypeScript programming languages. The information processing system 100 includes a web application component restriction check service 102, which is coupled via a network 106 to a set of web application servers 110. The web application servers 110 are assumed to be accessed, over network 106, by client devices 104-1, 104-2, . . . 104-M (collectively, client devices 104), such as via web browsers running on the client devices. Also coupled to the network 106 is a web application database 108, which may store various information relating to the web applications hosted by the web application servers 110 as will be described in further detail below.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications hosted by the web application servers 110. Such information may include, but is not limited to, information regarding restriction checks for different web applications. The restriction check information may include a set of restriction identifiers (IDs) that specify different types of modification actions (e.g., clearing or removing an attribute value, replacing an attribute value with another value, preventing a function from running, replacing the result of a function, etc.) to be performed based at least in part on the results of one or more restriction checks. The web application component restriction check service 102, for example, may read the web application database 108 to apply an appropriate modification action to a component of a web application based at least in part on a restriction ID that is specified in a configuration-based code construct for implementing restriction checks in that component of the web application.

The web application database 108 in some embodiments is implemented using one or more storage systems or devices associated with the web application component restriction check service 102 or web application servers 110. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web application component restriction check service 102, the client devices 104, the web application database 108, and the web application servers 110, as well as to support communication between the web application component restriction check service 102, client devices 104, web application database 108, web application servers 110 and other related systems and devices not explicitly shown.

In some embodiments, the client devices 104 and/or web application servers 110 may implement host agents that are configured for communication with the web application component restriction check service 102. The host agents may be configured to invoke the web application component restriction check service 102 when a particular web application (e.g., that is hosted by one of the web application servers 110 and which is run partially in a web browser on one of the client devices 104) attempts to access or utilize a component of that web application that has configuration-based restriction checks enabled via one or more code constructs associated with one or more lifecycle hooks of the component of the web application. Once invoked, the web application component restriction check service 102 can perform or apply appropriate restriction checks and modify operation of the component of the web application, as specified in the configuration-based code constructs that are associated with the one or more lifecycle hooks of the component of the web application.

It should be noted that a "host agent" as this term is generally used herein may comprise an automated entity, such as a software entity running on a processing device. Accordingly, a host agent need not be a human entity.

Although shown as separate from the client devices 104 and web application servers 110 in the FIG. 1 embodiment, it should be appreciated that the web application component restriction check service 102 may be implemented at least in part within one or more of the client devices 104 or web application servers 110 in some embodiments.

The web application component restriction check service 102 in the FIG. 1 embodiment is assumed to be implemented using at least one processing device. Each such processing device generally comprises at least one processor and an associated memory, and implements one or more functional modules for controlling certain features of the application framework migration service 102. In the FIG. 1 embodiment, the web application component restriction check service 102 implements a web application component lifecycle hook wrapping module 112, a restriction check application module 114, and a web application component modification module 116.

The web application component lifecycle hook wrapping module 112 is configured to monitor one or more web applications executing on the client devices 104 and web application servers 110 to determine activation of lifecycle hooks that are associated with configuration-based code constructs specifying restriction checks. On detecting activation of such a lifecycle hook, the web application component lifecycle hook wrapping module 112 will intercept such activation to implement the restriction checks prior to running the code of the component of the web application associated with the configuration-based code construct. The configuration-based code construct may comprise a code annotation, which is referred to as a decorator in certain script programming languages such as JavaScript and TypeScript.

The restriction check application module 114 is configured to perform or apply the restriction checks specified in the configuration-based code construct associated with the lifecycle hook of the component of the web application. This may include, for example, authenticating a user that is executing the web application to determine the type of access rights that the user has to the component of the web application. Any suitable type of user authentication may be performed, including utilizing single sign-on (SSO) techniques for authenticating the user to determine access rights.

The web application component modification module 116 modifies the component of the web application based at least in part on results of performing the restriction checks specified in the configuration-based code construct associated with the lifecycle hook of the component of the web application. This may include, for example, clearing or removing attribute values, replacing attribute values, preventing functions from running, replacing function results, etc. as specified by the configuration-based code construct and restriction identifiers contained therein. The web application component lifecycle hook wrapping module 112 then activates the lifecycle hook with the modified component of the web application.

It is to be appreciated that the particular arrangement of the web application component restriction check service 102, the web application component lifecycle hook wrapping module 112, the restriction check application module 114, and the web application component modification module 116 illustrated in the FIG. 1 embodiment is presented by way of example only, and alternative arrangements can be used in other embodiments. As discussed above, for example, the web application component restriction check service 102, or portions thereof such as one or more of the web application component lifecycle hook wrapping module 112, the restriction check application module 114, and the web application component modification module 116, may in some embodiments be implemented internal to one or more of the client devices 104 or web application servers 110. As another example, the functionality associated with the web application component lifecycle hook wrapping module 112, the restriction check application module 114, and the web application component modification module 116 may be combined into one module, or separated across more than three modules with the multiple modules possibly being implemented with multiple distinct processors or processing devices.

At least portions of the web application component lifecycle hook wrapping module 112, the restriction check application module 114, and the web application component modification module 116 may be implemented at least in part in the form of software that is stored in memory and executed by a processor.

It is to be understood that the particular set of elements shown in FIG. 1 for enabling restriction checks in components of web applications using configuration-based code constructs is presented by way of illustrative example only, and in other embodiments additional or alternative elements may be used. Thus, another embodiment may include additional or alternative systems, devices and other network entities, as well as different arrangements of modules and other components.

The web application component restriction check service 102 and other portions of the system 100 may be part of cloud infrastructure as will be described in further detail below. The cloud infrastructure hosting the web application component restriction check service 102 may also host one or more of the web application servers 110 and/or client devices 104.

The web application component restriction check service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web application component restriction check service 102, client devices 104, web application database 108 and web application servers 110 or components thereof may be implemented on respective distinct processing platforms, although numerous other arrangements are possible. For example, in some embodiments at least portions of the web application component restriction check service 102 and one or more of the client devices 104 or web application servers 110 are implemented on the same processing platform. A given one of the web application servers 110 or client devices 104 can therefore be implemented at least in part within at least one processing platform that implements at least a portion of the web application component restriction check service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web application component restriction check service 102, client devices 104, web application database 108 and web application servers 110, or portions or components thereof, to reside in different data centers. Numerous other distributed implementations are possible. The web application component restriction check service 102 or portions thereof can also be implemented in a distributed manner across multiple data centers.

Additional examples of processing platforms utilized to implement the web application component restriction check service 102 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
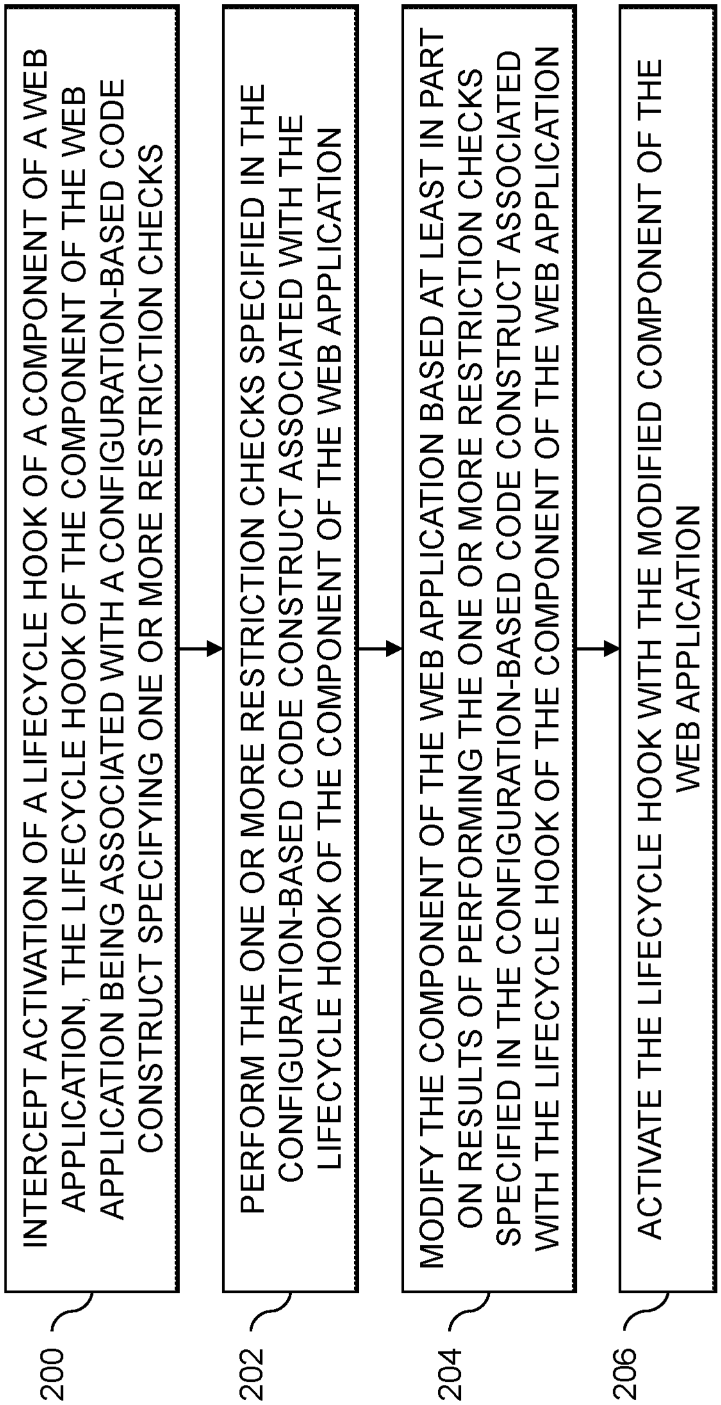
FIG. 2 is a flow diagram of an exemplary process for enabling restriction checks in components of web applications using configuration-based code constructs in an illustrative embodiment.

An exemplary process for enabling restriction checks in components of web applications using configuration-based code constructs will now be described in more detail with reference to the flow diagram of FIG. 2. It is to be understood that this particular process is only an example, and that additional or alternative processes for enabling restriction checks in components of web applications using configuration-based code constructs may be used in other embodiments.

In this embodiment, the process includes steps 200 through 206. These steps are assumed to be performed by the web application component restriction check service 102 utilizing the web application component lifecycle hook wrapping module 112, the restriction check application module 114, and the web application component modification module 116. The process begins with step 200, intercepting activation of a lifecycle hook of a component of a web application. The lifecycle hook of the component of the web application is associated with a configuration-based code construct specifying one or more restriction checks. The configuration-based code construct associated with the lifecycle hook of the component of the web application may comprise an annotation. In some script programming languages, such as JavaScript and TypeScript, annotations are referred to as decorators. The lifecycle hook is defined by a web application framework of the web application. The lifecycle hook comprises one of a set of lifecycle hooks for the web application framework to create, render and remove the component of the web application.

In step 202, the one or more restriction checks specified in the configuration-based code construct associated with the lifecycle hook of the component of the web application are performed (e.g., applied to one or more portions of code of the component of the web application). The one or more restriction checks are configured to be dynamically updated while the web application is executing to alter real-time presentation of content by the component of the web application to a user executing the web application. The one or more restriction checks may be based at least in part on an identity of a user executing the web application, and dynamically updating the one or more restriction checks may be responsive to changes in access rights of the user. The one or more restriction checks may be based at least in part on one or more restriction identifiers specifying actions to be taken for the real-time alteration of the content presented by the component of the web application to the user executing the web application, and dynamically updating the one or more restriction checks may be responsive to changes in the one or more restriction identifiers.

The component of the web application is modified in step 204 based at least in part on results of the one or more restriction checks specified in the configuration-based code construct associated with the lifecycle hook of the component of the web application. Modifying the component of the web application comprises refreshing a document object model (DOM) utilized by a web application framework of the web application. In step 206, the lifecycle hook is activated with the modified component of the web application.

The component of the web application may comprise a code class, and the configuration-based code construct may be associated with at least one attribute or function of the code class. The configuration-based code construct may specify one or more restriction identifiers for one or more actions to be taken on the associated at least one attribute or function of the code class responsive to the one or more restriction checks. The actions may include: clearing or removing a given attribute value in response to the one or more restriction checks denying a user executing the web application access to the component of the web application; replacing a given attribute value with another attribute value, the other attribute value being selected from a set of one or more potential replacement attribute values based at least in part on available access rights for a user executing the web application; preventing a given function from running in response to the one or more restriction checks denying a user executing the web application access to the component of the web application; replacing a given result of a given function with another result, the other result being selected from a set of one or more potential replacement results based at least in part on available access rights for a user executing the web application; etc.

Figure 3:
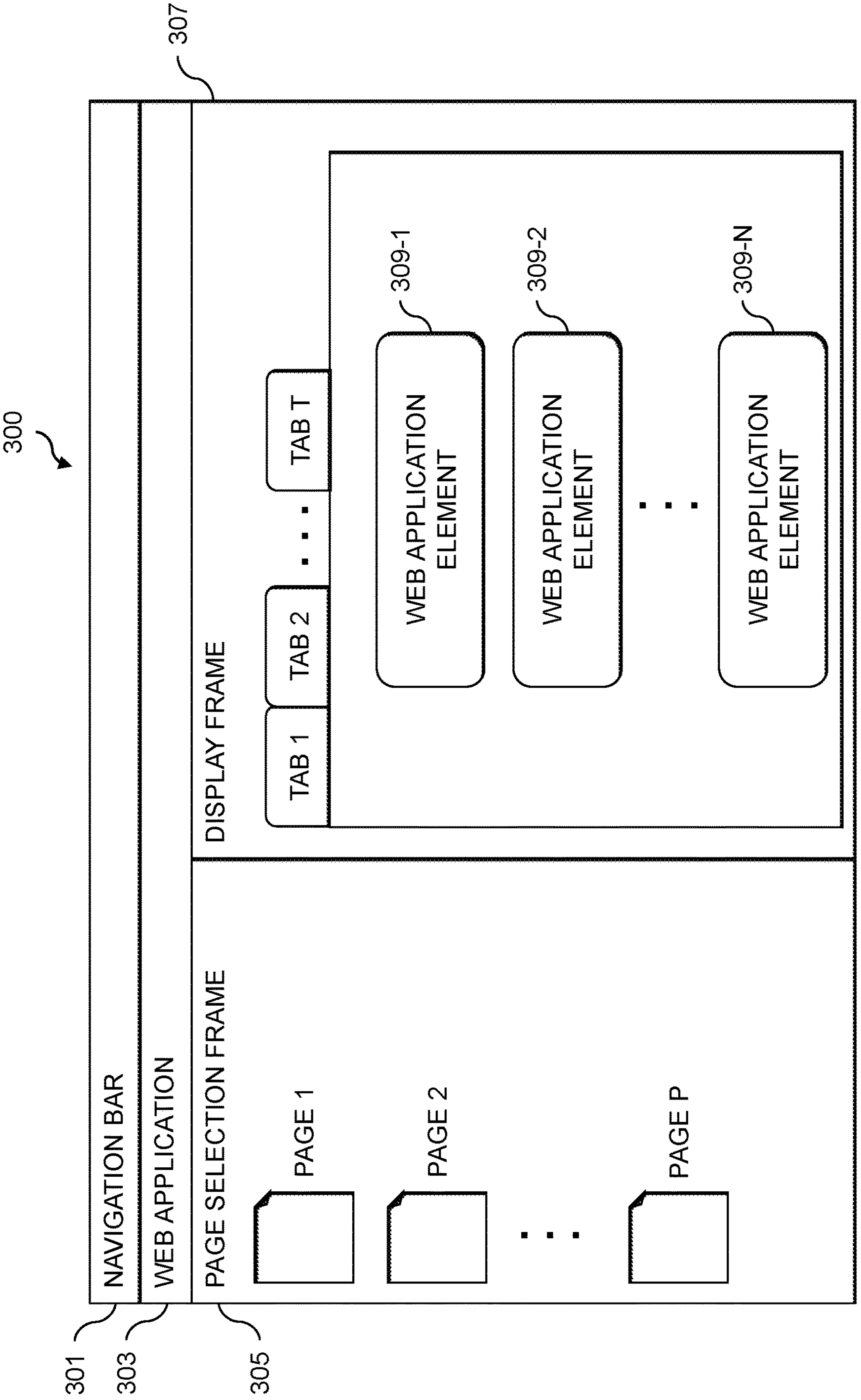
FIG. 3 illustrates a view of different portions of a web application in an illustrative embodiment.

FIG. 3 shows an example layout 300 of a web application 303. The layout 300 includes a navigation bar 301, which may be a portion of a web browser that is utilized to type in or otherwise input uniform resource locators (URLs) to load the web application 303. The web application 303 also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of web application elements 309-1, 309-2, . . . 309-N (collectively, elements 309). The web application elements 309 may comprise charts, plots, tables, visualizations, widgets, or other elements of the web application 303.

In some embodiments, it is desired to configure restriction in different portions of components of a web application such as web application 303. A component or portion of the web application 303 may include one or more of the elements 309, one or more of the tabs, one or more of the pages, etc. A component may also be more fine-grained, referring to portions of code such as code classes, methods, functions, etc.

Configuring restrictions in a web application such as web application 303 can quickly become a tedious issue, especially when the time comes to update the restrictions. Restrictions in a web application refer to access right checks that impact attribute values, function results, global user interface (UI) behavior, etc. The restrictions are checked through methods made available through a service or shared object in the code of the web application. Such an arrangement, however, utilizes a significant amount of boilerplate and other repetitive code. Further, when the service or shared object needs to change or requires an update due to new method signatures, this requires significant manual effort due to the fact that such checks could be located anywhere.

Illustrative embodiments provide techniques for enabling restrictions in web applications through the use of configurations. The configurations provide restriction-based values for attributes and functions in a web application. Being configuration-based removes the need for boilerplate and repetitive code that needs to be written for every check. By using less code, there are fewer potential issues and less maintenance required.

The configuration-based restrictions may utilize metaprogramming principles whereby a component of a web application can be read, analyzed and transformed or modified (e.g., at runtime) to implement restriction checks. To do so, some embodiments utilize annotations, which are referred to as decorators in JavaScript and TypeScript. A decorator is a type of declaration that can be attached to various code (e.g., class declarations, methods, accessors, properties, parameters, etc.). Decorators use a specific syntax in TypeScript (e.g., @expression) where the expression calls a function at runtime. To implement restriction checks, the expression can call functions which apply the restriction checks and modify a component of a web application as desired based at least in part on the results of the restriction checks. Annotations or decorators are used to build runtime instruction for implementing restrictions in web applications. The use of annotations or decorators to implement restrictions makes the code enabling such restrictions easier to notice and find, thereby improving code readability and maintenance.

Annotations, which are called decorators in JavaScript, are not widely supported. TypeScript, which is an open-source programming language that is a superset of JavaScript, has some support for annotations or decorators. TypeScript brings support for simple decorators that can run simple code. However, external functions cannot be called as decorator implementation in TypeScript relies on static code analysis.

A web application framework (e.g., Angular) may provide various lifecycle hooks for components, directive or other portions of a web application. Each component of the web application has an associated lifecycle, where that component is created, rendered and then destroyed or removed. The web application framework utilized by a web application can define various lifecycle hooks that enable actions to be taken when certain lifecycle events for the component of the web application occur. In some embodiments, the restrictions or checks are injected within a lifecycle hook of the component, directive or other portion of the web application before any other code is run, so that the component, directive or other portion of the web application can benefit from the web application framework's injection capabilities along with enabling the possibility to do any call. The process should remain synchronous, except if the modified attribute or method is defined in an asynchronous way (e.g., through the use of Observables).

TypeScript's strongly typed definitions allow for decorators to require specific functionalities to be injected in the class that uses the decorator. This ensures that using the decorator provides the right services and implementations. This also helps to define exactly which configuration the decorator accepts, providing an easy-to-use functionality for developers.

Framework lifecycle interfaces are also utilized by the decorators. The added decorators need to survive the web application framework's internal compilation process, including any late optimizations performed at the very end of the compilation process. Enforcing the implementation of well-chosen lifecycle interfaces helps the different optimizers to retain the hook injected by the decorator.

Figure 4:
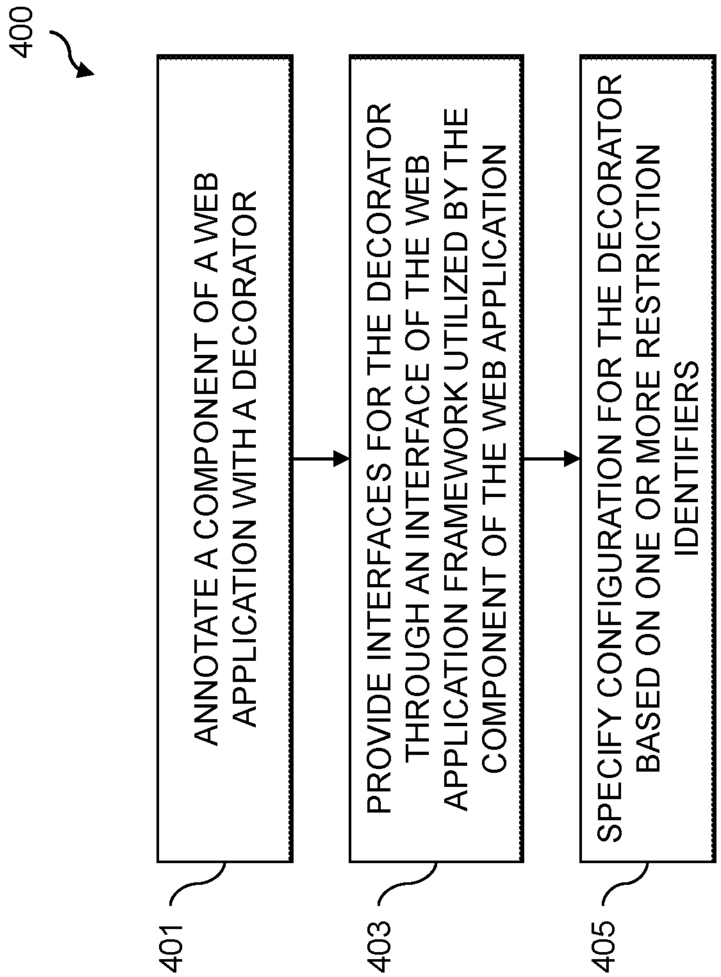
FIG. 4 shows a system flow for inserting a decorator for a component of a web application in an illustrative embodiment.

FIG. 4 shows a system flow 400 for inserting a decorator or other configuration-based restriction check for a component of a web application. The system flow 400 begins in step 401 with annotating the component of the web application with a decorator. This may include, for example, annotating the proper attributes or functions of the component of the web application with the decorator. In step 403, interfaces for the decorator are provided through an interface of the web application framework utilized by the component of the web application. This may include, for example, providing the requested interfaces for the decorator through an interface of a target class in code of the component of the web application. In step 405, a configuration for the decorator is specified based at least in part on one or more restriction identifiers (IDs). The restriction IDs may specify particular actions that the restriction check will apply (e.g., when the restriction is applied), including but not limited to: clearing or removing an attribute value when access is denied; replacing an attribute value with another; choosing among potential replacement values based at least in part on available access rights; preventing a function from running when access is denied; replacing a function's result based at least in part on available access rights; etc.

Figure 5:
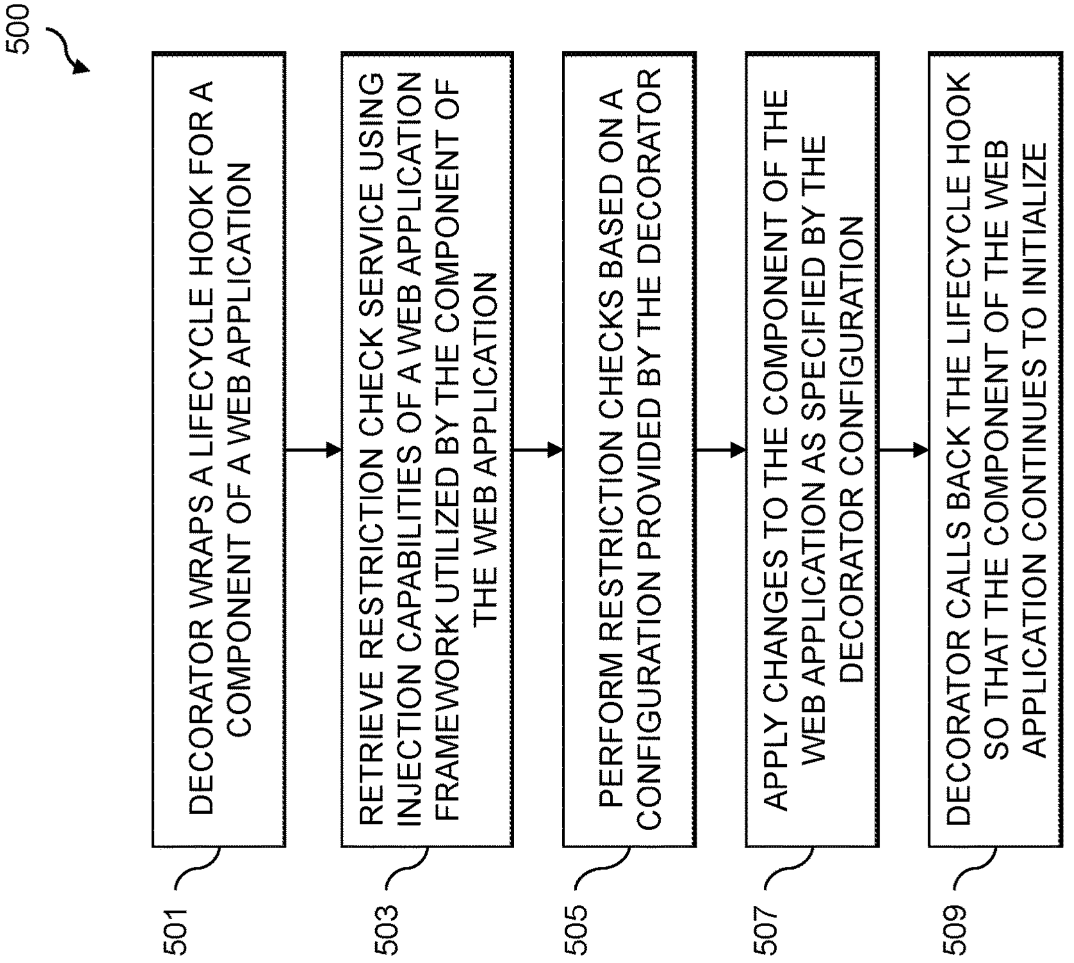
FIG. 5 shows a system flow for a decorator to implement restriction checks for a component of a web application in an illustrative embodiment.

FIG. 5 shows a system flow 500 for a decorator to implement restriction checks for a component of a web application. In step 501, the decorator wraps a lifecycle hook for the component of the web application. The decorator wraps the lifecycle hook, which is assumed to kick in before the component is active in the web application. In step 503, the decorator retrieves a restriction check service using injection capabilities of a web application framework utilized by the component of the web application. Next, in step 505, the restriction checks are performed based at least in part on a configuration provided by the decorator. The restriction checks may call any applicable methods from the restriction check service. In step 507, changes are applied to the component of the web application as specified by the decorator configuration based at least in part on the performed restriction checks. This may include, for example, the decorator applying changes to resulting values at any time, which causes the underlying web application framework to refresh its model (e.g., its DOM) thus hiding the potentially asynchronous nature of the restriction checks. Applying changes may include taking actions specified based at least in part on restriction IDs and the result of the restriction checks. Based at least in part on the actions specified by the restriction IDs, the decorator wraps or replaces values or functions of the component of the web application. In step 509, the decorator then calls back the lifecycle hook (which was wrapped in step 501) so that the component of the web application can continue to initialize as modified based at least in part on the restriction checks applied by the decorator.

Advantageously, the use of decorators for restriction checks (e.g., including value selection and replacement) in a client-side of a web application enables the restrictions to be updated live or dynamically, and the UI can react to them at any time as long as they are observable. Using decorators allows for fine-grained restrictions, in addition to reactive restrictions. Thus, if user access rights change, the web application can add or hide content dynamically.

Approaches for access restriction in web applications may rely on code calling the service methods at every applicable location. While functional, this results in restriction checks dispatched all over the code, which is harder to review and maintain. Using high-level decorators or annotations in code removes the requirement for boilerplate and repetitive code, and also helps to identify what is actually being restricted. Further, approaches may rely on static checks that cannot react in real-time to changes without a lot of boilerplate code with potential leaks. The techniques described herein, in contrast, allow for checks to be re-evaluated as the underlying data changes and propagates those changes without any additional code.

Various programming languages (e.g., Java, Python, etc.) support annotation-based restrictions. There is a greater challenge in utilizing annotations for restrictions in web applications, however, due to the limitations of TypeScript and JavaScript programming languages used in various web application frameworks (e.g., Angular) as it relates to annotations (e.g., which are referred to as decorators in such programming languages). The fact that the displayed view (e.g., in a browser on the client-side of the web application) can change automatically as the restrictions are modified is another challenge that applications built in programming languages such as Java and Python do not have, as they do not need to be reactive.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling restriction checks in components of web applications using configuration-based code constructs will now be described in greater detail with reference to FIGS. 6 and 7. Although described in the context of system 100, these platforms may also be used to implement at least portions of other information processing systems in other embodiments.

Figure 6:
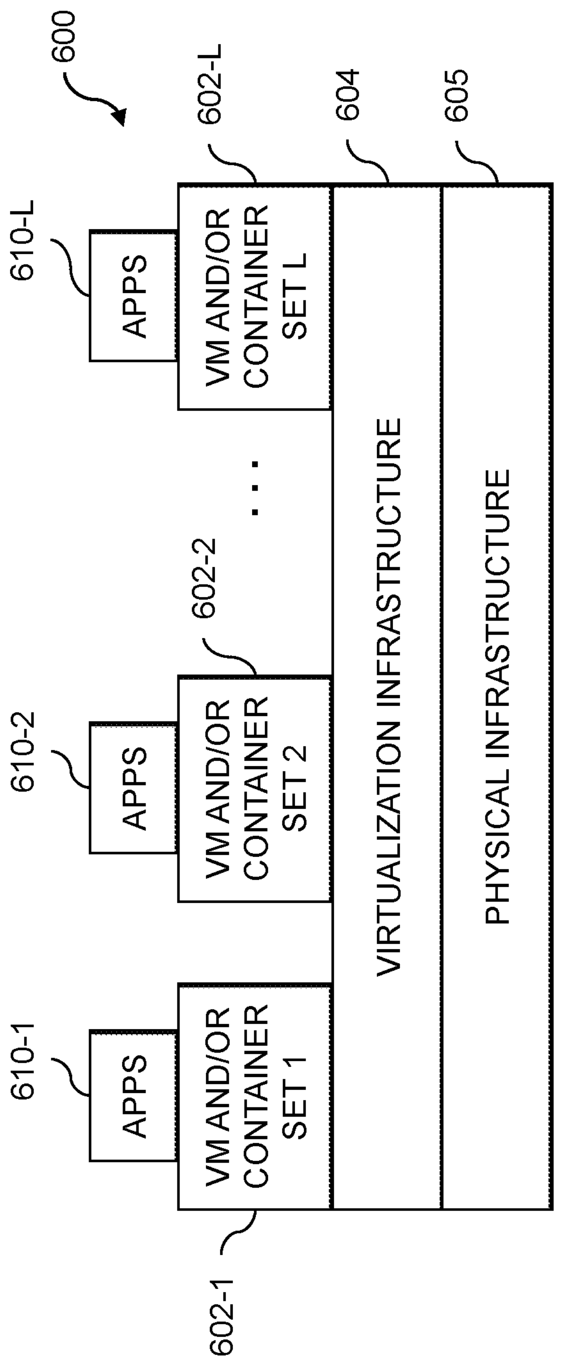
FIGS. 6 and 7 show examples of processing platforms that may be utilized to implement at least a portion of an information processing system in illustrative embodiments.
Figure 7:
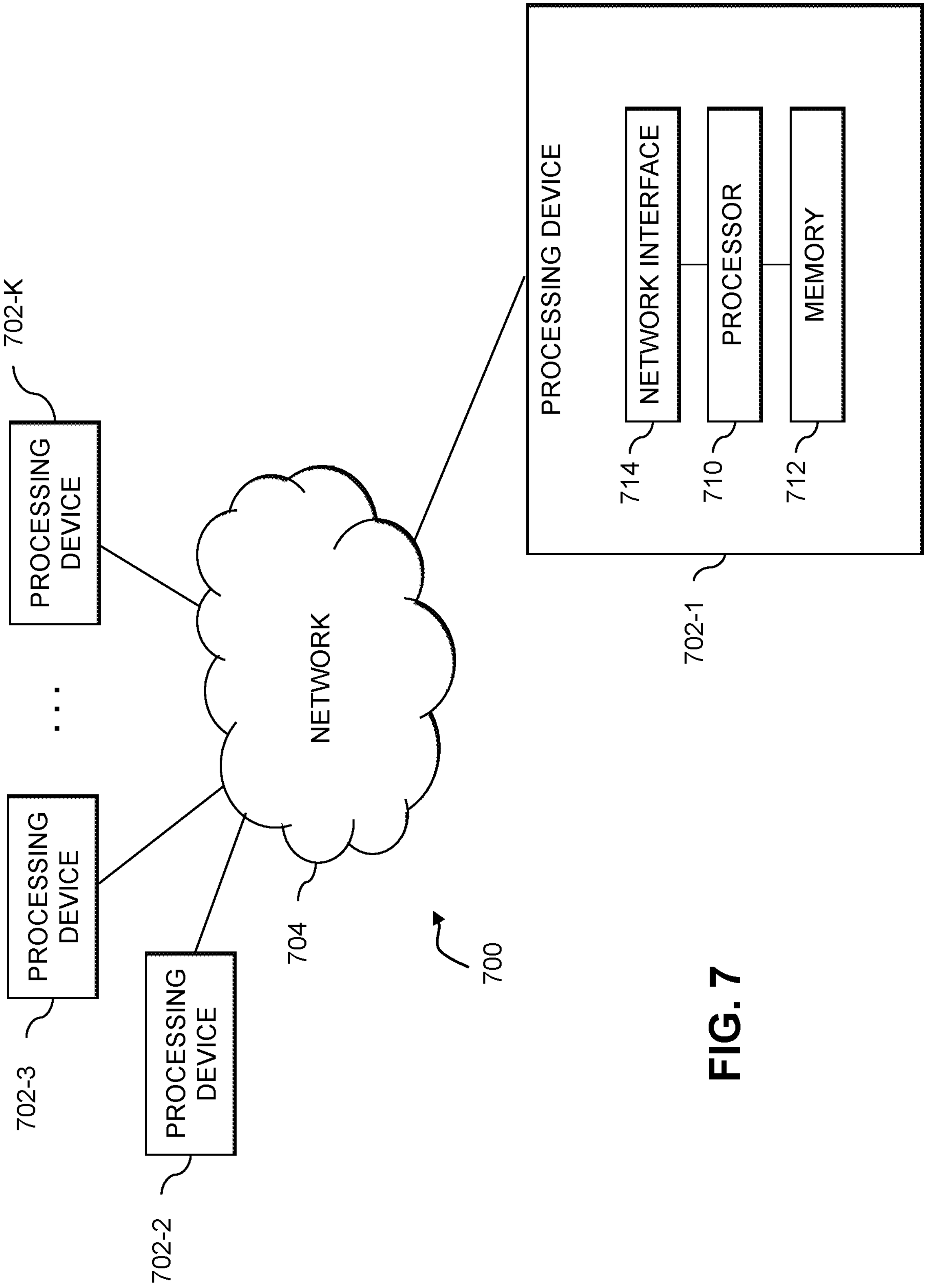

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling restriction checks in components of web applications using configuration-based code constructs as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application components, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

intercepting activation of a lifecycle hook of a component of a web application, the lifecycle hook of the component of the web application being associated with a configuration-based code construct specifying one or more restriction checks;

performing the one or more restriction checks specified in the configuration-based code construct associated with the lifecycle hook of the component of the web application;

modifying the component of the web application based at least in part on results of performing the one or more restriction checks specified in the configuration-based code construct associated with the lifecycle hook of the component of the web application; and activating the lifecycle hook with the modified component of the web application;

wherein the configuration-based code construct comprises one or more restriction identifiers specifying one or more actions to be taken to modify the component of the web application responsive to the one or more restriction checks, at least a given one of the one or more restriction identifiers being configured to control selection among a set of two or more potential modification actions based at least in part on available access rights for a user executing the web application.

2. The apparatus of claim 1 wherein the configuration-based code construct associated with the lifecycle hook of the component of the web application comprises an annotation.

3. The apparatus of claim 2 wherein the component of the web application utilizes a script programming language, and wherein the annotation comprises a decorator.

4. The apparatus of claim 1 wherein modifying the component of the web application comprises refreshing a document object model (DOM) utilized by a web application framework of the web application.

5. The apparatus of claim 1 wherein the one or more restriction checks, specified in the configuration-based code construct associated with the lifecycle hook of the component of the web application, are configured to be dynamically updated while the web application is executing to alter real-time presentation of content by the component of the web application to the user executing the web application.

6. The apparatus of claim 5 wherein the one or more restriction checks are based at least in part on an identity of the user executing the web application, and wherein dynamically updating the one or more restriction checks is responsive to changes in access rights of the user.

7. The apparatus of claim 5 wherein the one or more actions specified by the one or more restriction identifiers comprise at least one action to be taken for the real-time alteration of the content presented by the component of the web application to the user executing the web application, and wherein dynamically updating the one or more restriction checks is responsive to changes in at least one of the one or more restriction identifiers.

8. The apparatus of claim 1 wherein the lifecycle hook is defined by a web application framework of the web application, the lifecycle hook comprising one of a set of lifecycle hooks for the web application framework to create, render and remove the component of the web application.

9. The apparatus of claim 1 wherein the component of the web application comprises a code class, wherein the configuration-based code construct is associated with at least one attribute of the code class, and wherein the one or more actions specified by the one or more restriction identifiers comprise at least one action to be taken on the at least one attribute of the code class responsive to at least one of the one or more restriction checks.

10. The apparatus of claim 9 wherein the at least one action for the at least one restriction identifier comprises at least one of clearing and removing an attribute value of the at least one attribute in response to the at least one restriction check denying the user executing the web application access to the component of the web application.

11. The apparatus of claim 9 wherein the at least one action for the at least one restriction identifier comprises replacing at least one attribute value with another attribute value, the other attribute value being selected from a set of one or more potential replacement attribute values based at least in part on the available access rights for the user executing the web application.

12. The apparatus of claim 1 wherein the component of the web application comprises a code class, wherein the configuration-based code construct is associated with at least one function of the code class, and wherein the one or more actions specified by the one or more restriction identifiers comprise at least one action to be taken on the at least one function of the code class responsive to at least one of the one or more restriction checks.

13. The apparatus of claim 12 wherein the at least one action for the at least one restriction identifier comprises preventing a given function from running in response to the at least one restriction check denying the user executing the web application access to the component of the web application.

14. The apparatus of claim 12 wherein the at least one action for the at least one restriction identifier comprises replacing a given result of a given function with another result, the other result being selected from a set of one or more potential replacement results based at least in part on the available access rights for the user executing the web application.

15. A computer program product comprising a non-transitory processor-readable storage medium having stored therein program code of one or more software programs, wherein the program code when executed by at least one processing device causes the at least one processing device to perform steps of:

intercepting activation of a lifecycle hook of a component of a web application, the lifecycle hook of the component of the web application being associated with a configuration-based code construct specifying one or more restriction checks;

performing the one or more restriction checks specified in the configuration-based code construct associated with the lifecycle hook of the component of the web application;

modifying the component of the web application based at least in part on results of performing the one or more restriction checks specified in the configuration-based code construct associated with the lifecycle hook of the component of the web application; and activating the lifecycle hook with the modified component of the web application;

wherein the configuration-based code construct comprises one or more restriction identifiers specifying one or more actions to be taken to modify the component of the web application responsive to the one or more restriction checks, at least a given one of the one or more restriction identifiers being configured to control selection among a set of two or more potential modification actions based at least in part on available access rights for a user executing the web application.

16. The computer program product of claim 15 wherein the one or more restriction checks, specified in the configuration-based code construct associated with the lifecycle hook of the component of the web application, are configured to be dynamically updated while the web application is executing to alter real-time presentation of content by the component of the web application to the user executing the web application.

17. The computer program product of claim 15 wherein the component of the web application comprises a code class, wherein the configuration-based code construct is associated with at least one attribute or function of the code class, and wherein the one or more actions specified by the one or more restriction identifiers comprise at least one action to be taken on the at least one attribute or function of the code class responsive to the one or more restriction checks.

18. A method comprising steps of:

intercepting activation of a lifecycle hook of a component of a web application, the lifecycle hook of the component of the web application being associated with a configuration-based code construct specifying one or more restriction checks;

performing the one or more restriction checks specified in the configuration-based code construct associated with the lifecycle hook of the component of the web application;

modifying the component of the web application based at least in part on results of performing the one or more restriction checks specified in the configuration-based code construct associated with the lifecycle hook of the component of the web application; and activating the lifecycle hook with the modified component of the web application;

wherein the configuration-based code construct comprises one or more restriction identifiers specifying one or more actions to be taken to modify the component of the web application responsive to the one or more restriction checks, at least a given one of the one or more restriction identifiers being configured to control selection among a set of two or more potential modification actions based at least in part on available access rights for a user executing the web application; and wherein the method is performed by at least one processing device comprising a processor coupled to a memory.

19. The method of claim 18 wherein the one or more restriction checks, specified in the configuration-based code construct associated with the lifecycle hook of the component of the web application, are configured to be dynamically updated while the web application is executing to alter real-time presentation of content by the component of the web application to the user executing the web application.

20. The method of claim 18 wherein the component of the web application comprises a code class, wherein the configuration-based code construct is associated with at least one attribute or function of the code class, and wherein the one or more actions specified by the one or more restriction identifiers comprise at least one action to be taken on the at least one attribute or function of the code class responsive to the one or more restriction checks.

* * * * *